United States Patent
O'Connor et al.

(10) Patent No.: US 7,581,065 B2
(45) Date of Patent: Aug. 25, 2009

(54) LOW LOCALITY-OF-REFERENCE SUPPORT IN A MULTI-LEVEL CACHE HIERACHY

(76) Inventors: Dennis M. O'Connor, 12130 E. Via de Palmas, Chandler, AZ (US) 85249-3407; Michael W. Morrow, P.O. Box 647, Mossisville, NC (US) 27560

( * ) Notice: Subject to any disclaimer, the term of this patent is extended or adjusted under 35 U.S.C. 154(b) by 286 days.

(21) Appl. No.: 11/101,785

(22) Filed: Apr. 7, 2005

(65) Prior Publication Data
US 2006/0230235 A1    Oct. 12, 2006

(51) Int. Cl.
*G06F 12/08*    (2006.01)

(52) U.S. Cl. ........................ 711/122; 711/133; 711/136; 711/144; 711/145; 711/159

(58) Field of Classification Search ................... 711/122
See application file for complete search history.

(56) References Cited

U.S. PATENT DOCUMENTS

| | | | |
|---|---|---|---|
| 5,537,573 A * | 7/1996 | Ware et al. | 711/137 |
| 5,721,874 A * | 2/1998 | Carnevale et al. | 711/171 |
| 5,829,025 A * | 10/1998 | Mittal | 711/122 |
| 6,119,205 A * | 9/2000 | Wicki et al. | 711/143 |
| 6,223,256 B1 * | 4/2001 | Gaither | 711/134 |
| 6,370,618 B1 * | 4/2002 | Arimilli et al. | 711/122 |
| 6,393,522 B1 * | 5/2002 | Campbell | 711/120 |
| 6,532,520 B1 * | 3/2003 | Dean et al. | 711/133 |
| 6,766,419 B1 * | 7/2004 | Zahir et al. | 711/133 |
| 2003/0140198 A1* | 7/2003 | Ninose et al. | 711/122 |
| 2005/0138292 A1* | 6/2005 | Sullivan | 711/122 |
| 2006/0041720 A1* | 2/2006 | Hu et al. | 711/136 |

* cited by examiner

*Primary Examiner*—Kevin L Ellis
*Assistant Examiner*—Alan M Otto
(74) *Attorney, Agent, or Firm*—Blakely, Sokoloff, Taylor & Zafman LLP

(57) ABSTRACT

A processor includes a multi-level cache hierarchy where locality information property such as a Low Locality of Reference (LLR) property is associated with a cache line. The LLR cache line retains the locality information and may move back and forth within the cache hierarchy until evicted from the outer-most level of the cache hierarchy.

10 Claims, 5 Drawing Sheets

LOW LOCALITY-OF-REFERENCE SUPPORT IN A MULTI-LEVEL CACHE HIERACHY

Digital computers include cache memories for storing instructions that are faster static memories as compared to the slower dynamic memories used for the computer's main memory. Through use of replacement algorithms and cache hierarchy, cache data may be moved and controlled to provide a relatively high hit rate. Improvements are needed in cache memory to speed up the flow of instructions to the execution unit of the computer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
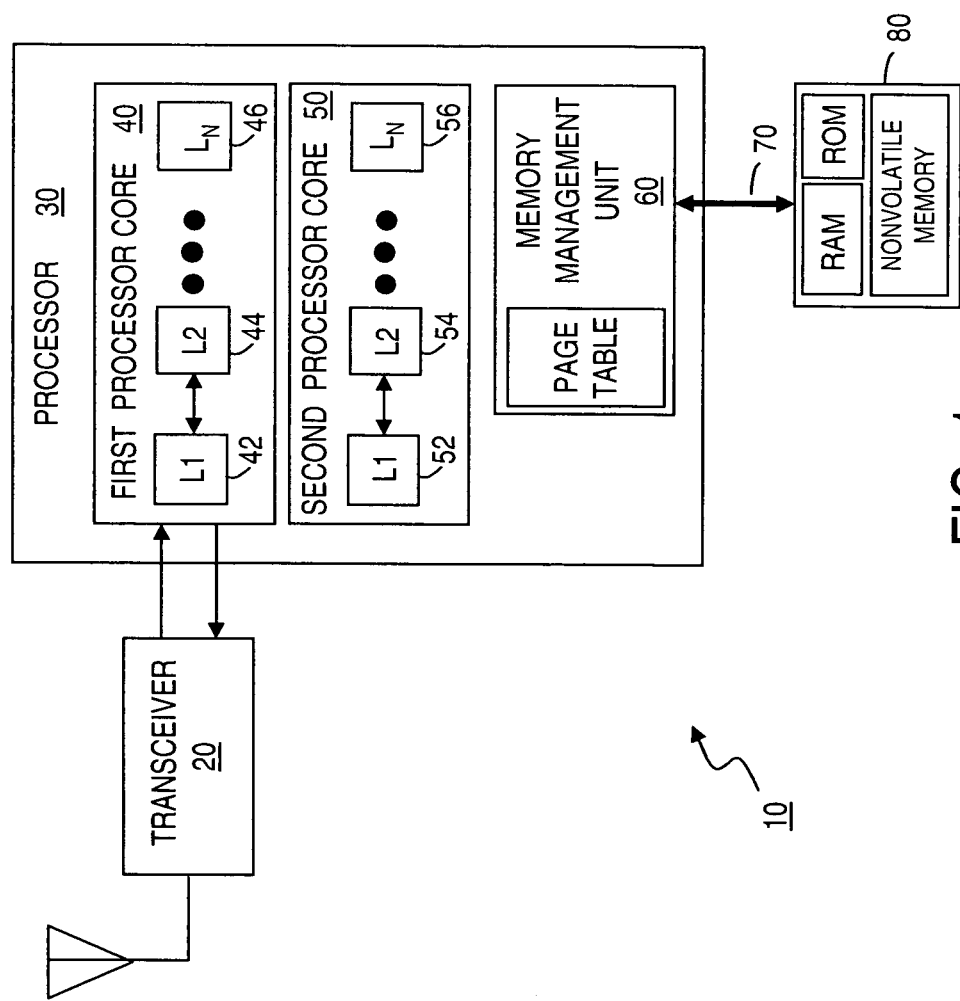
FIG. 1 illustrates processor cores in a wireless device that incorporates cache information to store locality information used in replacement decisions in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

FIG. 1 illustrates a wireless embodiment of the present invention that includes a processor 30 connected to a transceiver 20 to process the digitized quadrature signals, i.e., the in-phase "I" signal and the quadrature "Q" signal from the receiver chain. Accordingly, processor 30 includes baseband functions, but may further include application processing functions. One or more processor cores, i.e., cores 40 and 50, may be included in processor 30 to process functions that, in general, fetch instructions, generate decodes, find operands, perform appropriate actions, and then store results. The use of multiple cores may allow one core to be dedicated to baseband processes while the second core may be dedicated to application specific functions such as, for example, graphics, modem functions, etc. Alternatively, the multiple cores may allow processing workloads to be shared across the cores.

A memory management unit 60 includes a hardware/software interface between a host controller software driver and the host controller hardware that exchanges data across memory interface 70 with external system memory 80. System memory 80 may include a combination of memories such as a Random Access Memory (RAM), a Read Only Memory (ROM) and a nonvolatile memory, although the type or variety of memories included in the system memory is not a limitation of the present invention.

As illustrated in FIG. 1, processor 30 stores cache information in a multi-level cache memory hierarchy. In particular, a first processor core 40 includes a first or inner cache 42 that is labeled in the figure as L1, a second or outer cache 44 that is labeled as L2 and a final cache 46 in the multi-level cache memory hierarchy that is labeled as $L_N$. Similarly, a second processor core 50 includes a first or inner cache 52 that is labeled in the figure as L1, a second or outer cache 54 that is labeled as L2 and a final cache 56 in the multi-level cache memory hierarchy that is labeled as $L_N$.

The cache memory hierarchy illustrated by the L1, L2, . . . , $L_N$ levels provides time savings in operations executed by processor cores 40 and 50. Based on the hierarchy, if the processor core finds the data for its next operation in the first cache memory L1 ("level-1" cache memory), time is saved compared to having to retrieve that stored data from the next level ("level-2" or higher) in the hierarchy. Thus, the hierarchy allows cache memory data to be accessed more quickly from L1 cache than the larger L2, . . . , $L_N$ cache memory or main system memory 80.

In general, cache lines may be evicted from a first level of the cache memory hierarchy to a second level of the cache memory hierarchy. In accordance with the present invention, a property corresponding to the cache line accompanies the data associated with an evicted cache line within the multi-level cache hierarchy. By way of example, one property associated with the cache line is locality information that indicates the probability that the cache line will be used in a predetermined amount of time in the future is less than that of typical data in a cache line. The locality information may include spatial locality information and temporal locality information. The locality information, i.e., Low Locality of Reference (LLR), may be a bit or a particular state within a set of bits that is associated with a line. The bits may be stored in the cache lines TAG or stored separately in the cache line. Alternatively, the LLR property may be expressed indirectly by a state value that the cache maintains within a set or on a per set basis.

The LLR property may be determined, for example, by the processes performed when a page table makes the virtual address translation to a physical address. Typically, additional information about the memory allows decisions to be made such as, for example, a decision as to whether the data is cacheable or not, or decisions on privilege for code execution, reads and writes, among many other decisions. However, it should be understood that the LLR property may be determined by methods other than using the page table without limiting the subject matter of the claimed invention.

In accordance with the present invention, a cache line evicted from the first level cache L1 to one of the outer level caches L2, . . . , $L_N$ carries along that locality information property. By way of example, when the first level cache L1 evicts a cache line to an outer level cache, that outer level cache may take into account the LLR property associated with that evicted cache line when determining which line of data to replace within its own cache. The L2 cache may decide, based on the LLR property, to disallow that evicted cache line from replacing cache lines having non-LLR properties. Thus, the locality information helps in decision making on data that may be evicted or filled from a cache at any level in the multi-level cache hierarchy. Note that the locality information property also may accompany a cache line being filled from an outer level cache to an inner level cache in the cache memory hierarchy in accordance with the present invention.

The L1, L2, . . . , $L_N$ cache may store instructions and/or data and connect via address and control lines to system memory 80. A memory controller retrieves and processes current commands that are stored in the cache. The various embodiments of the present invention allow the locality information property to remain associated and travel with the cache line within the multi-level cache hierarchy. At each level of the cache hierarchy, the locality information property makes the cache line a preferred candidate for replacement when space for new data is needed in the cache. Again, a cache line that is evicted to the next or outward level of the cache hierarchy retains the locality information property. That cache line may then be filled from the outer level to an inner level if a request arrives before that cache line is evicted. Note that irrespective of the direction of travel; whether from an inner cache to an outer cache or from the outer cache to the inner cache, that cache line still retains the locality information property in accordance with the present invention.

Figure 2:
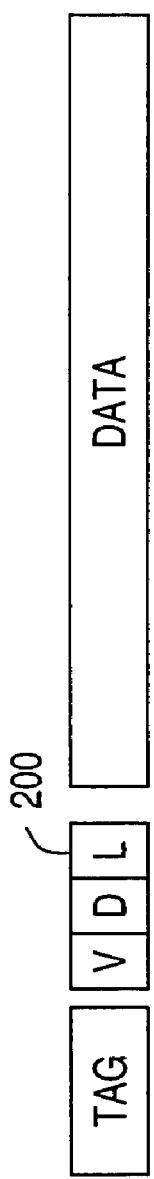
FIG. 2 illustrates an example of a simple write-back cache line that includes locality information.

FIG. 2 illustrates an example of a simple write-back cache line that includes. LLR support. The cache line includes a TAG which is an address of the data stored in the cache line; a VALID bit V that indicates if the cache line is valid; a DIRTY bit D that indicates if the cache line is modified; an LLR bit L (reference number 200) that is set if the cache area has LLR properties; and a DATA field that stores the data being cached. In accordance with associating the LLR bit L with the cache line, the bit L having been set designates an area of cache memory as likely to provide a low benefit to the processor and this area of cache memory may be more readily replaced than other data stored in the cache. It should be pointed out that neither the bit order nor the number of bits in each field of the cache line affects the claimed subject matter of the claimed invention.

Figure 3:
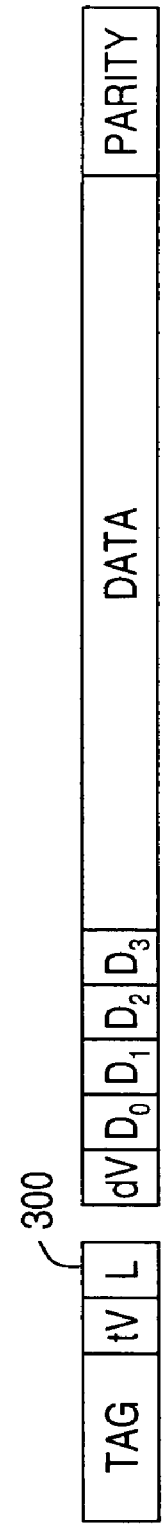
FIG. 3 illustrates another example of a write-back cache line that includes locality information.

FIG. 3 illustrates another example of a write-back cache line having LLR support. The cache line includes a TAG which is an address of the data stored in the cache line; a tV bit that is a tag valid bit to indicate if the TAG is valid; a bit L (reference number 300) to indicate if a cache area has LLR properties; a dV bit that is a data valid bit to indicate if data stored in the cache line is valid; a set of DIRTY bits designated as $D_0$-$D_3$ to provide information on each quarter of the line as to whether the data in that quarter was modified; a DATA field that stores the data being cached; and PARITY that is used to detect hardware errors.

Figure 4:
FIG. 4 illustrates an example of a write-back cache line for a 4-way set-associative cache having LLR support.

FIG. 4 illustrates an example of a write-back cache line for a 4-way set-associative cache having LLR support. In this embodiment of the cache line the LRU bits track the order in which cache lines have been accessed and Line 0, Line 1, Line 2 and Line 3 are lines in the set.

Figure 5:
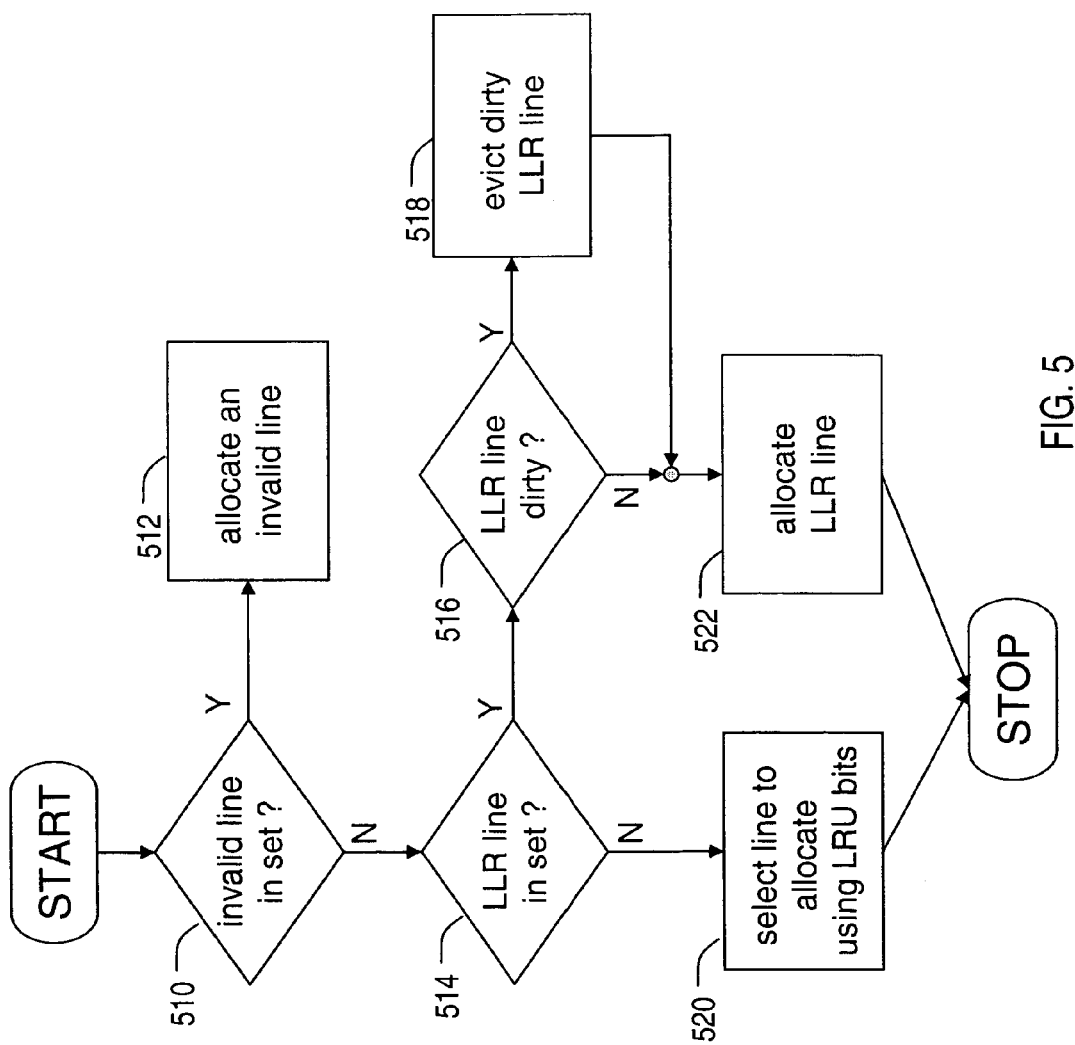
FIG. 5 is a flowchart for deciding which cache line in a set to allocate when a new line of data is put into the set on a cache fill.

FIG. 5 is a flowchart that may be used to decide which cache line in a set to allocate when a new line of data is stored into the set on a cache fill. A cache is checked to determine whether there is an invalid cache line in the set (process 510). If an invalid cache line is in the set, then the invalid line is allocated (process 512). If an invalid cache line is not in the set, then the LLR line property is checked (process 514). If the LLR line property attached to a cache line is set, then that cache line is checked to determine if it is dirty (process 516). If the cache line is dirty, then that dirty LLR line is evicted (process 518). If the LLR line was dirty or the LLR line was evicted, then the LLR line is allocated (process 522). Returning to process 514, if the LLR property attached to a cache line is not set, then that selected cache line is allocated using the LRU bits (process 520).

Figure 6:
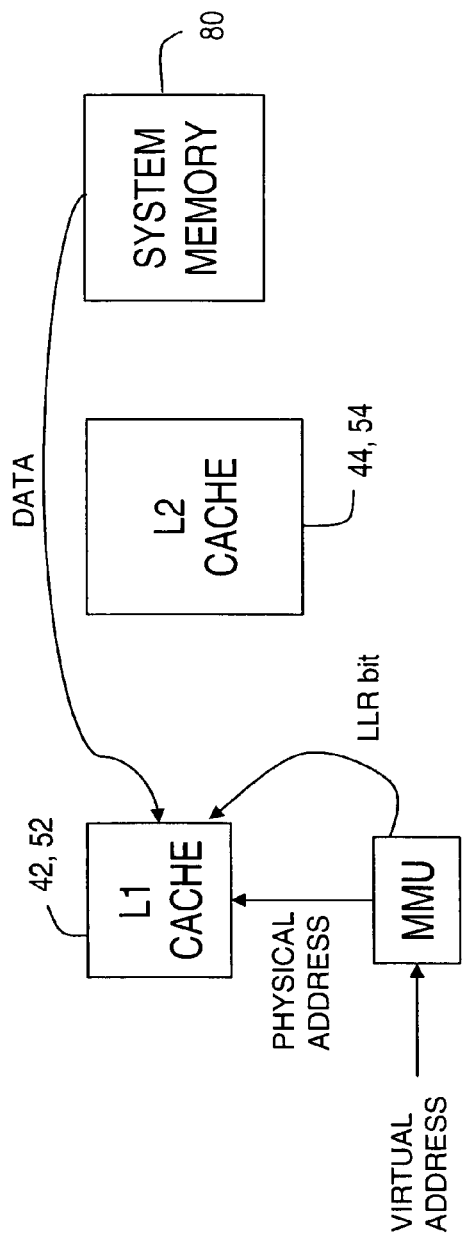
FIG. 6 illustrates an initial fetch of data from system memory into cache.

FIG. 6 illustrates an initial fetch of data from system memory 80 into cache. In this embodiment a virtual address is provided to the Memory Management Unit (MMU), which in response provides a physical address to the inner cache L1. Data from system memory 80 is then filled into inner cache L1. An LLR bit, as supplied by a page table in the MMU, is attached to the filled cache line.

Figure 7:
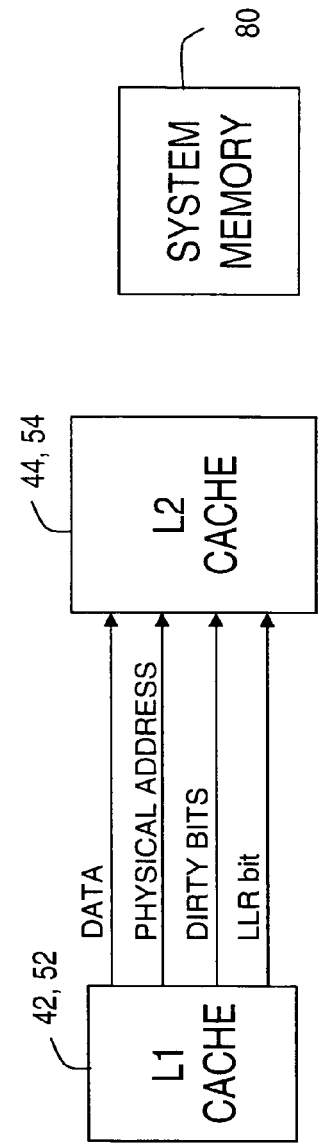
FIG. 7 illustrates eviction of a cache line from the first cache L1 to the outer cache L2.

FIG. 7 illustrates eviction of a cache line from the inner cache L1 to the outer cache L2. Note that the locality information property associated with the cache line accompanies the evicted cache line from the inner cache L1 for storage in the outer cache L2.

Figure 8:
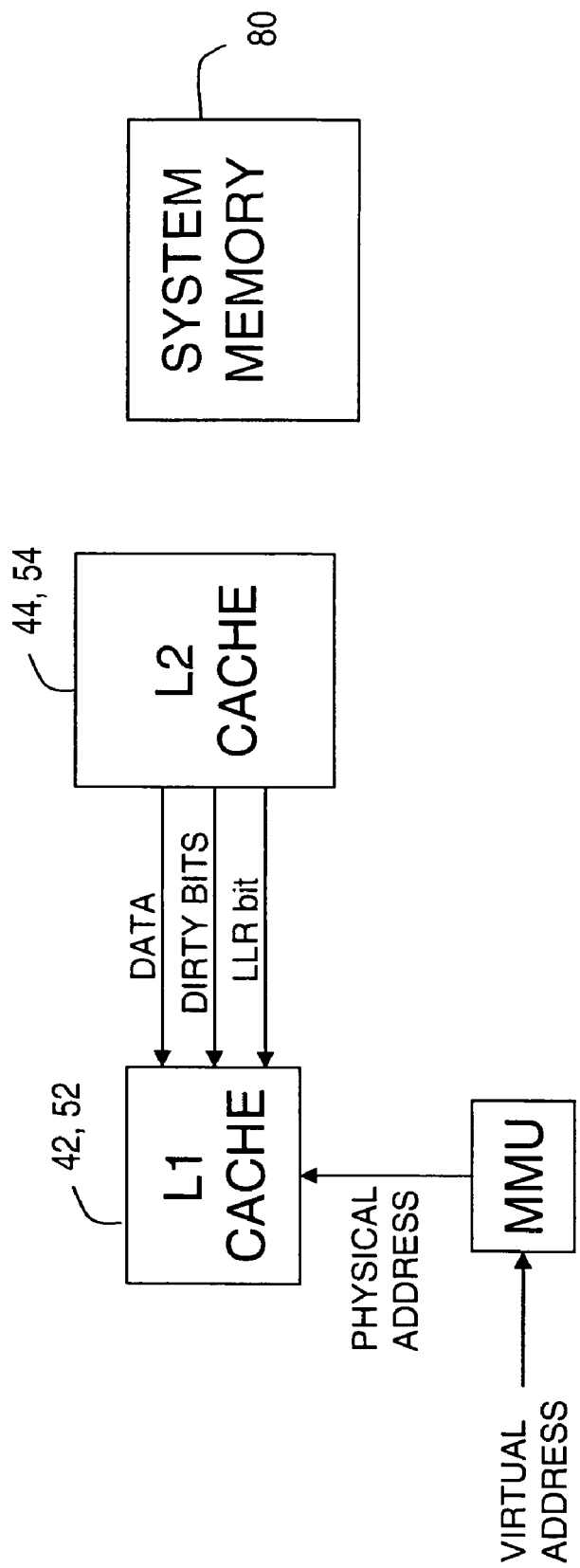
FIG. 8 illustrates the fill of a cache line from the outer cache L2 to the first cache L1.

FIG. 8 illustrates the fill of a cache line from the outer cache L2 to the inner cache L1. Again, note that the locality information property associated with the cache line accompanies the fill of the cache line from the outer cache L2 to the inner cache L1.

As already described, features of the present invention for the multi-level cache memory hierarchy may be incorporated into a wireless communications device 10. As such, the present invention may be used in smart phones, processors with radios, communicators and Personal Digital Assistants (PDAs). However, various embodiments of the present invention may also be integrated into a variety of products that do not communicate wirelessly. Accordingly, the claimed subject matter incorporated into microcontrollers, general-purpose microprocessors, Digital Signal Processors (DSPs), Reduced Instruction-Set Computing (RISC), Complex Instruction-Set Computing (CISC), medical or biotech equipment, automotive safety and protective equipment, and automotive infotainment products. However, it should be understood that the scope of the present invention is not limited to these examples.

By now it should be apparent that the present invention enhances processor performance by simplifying the cache replacement logic for caches that support LLR memory designations throughout the multi-level cache hierarchy. The LLR cache lines move back and forth within the cache hierarchy until evicted from the outer-most level of the cache hierarchy.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method to cache information in a multi-level cache memory hierarchy, comprising: evicting a cache line from a first level of the cache memory hierarchy to a second level of the cache memory hierarchy; and transmitting locality information as a low locality of reference (LLR) bit stored with the cache line in the first level to the second level for storage with the cache line to distinguish the cache line from other cache lines with different stored locality information, wherein the locality information indicates that the probability that the cache line will be used in a predetermined amount of time in the future is less than that of typical cache line data, wherein the second level of the cache memory uses the locality information in replacement and allocation decisions for the second level of the cache memory.

2. The method of claim 1, wherein obtaining locality information includes using a page table to obtain the locality information.

3. The method of claim 1, wherein the locality information is included in a tag field associated with the cache line.

4. The method of claim 1, wherein the first level of the cache memory hierarchy examines the locality information to determine whether to transfer the cache line to the second level of the cache memory hierarchy.

5. An article comprising a machine-accessible medium having associated data, wherein the data, when accessed, results in a machine performing: evicting a cache line from a first level of a cache memory hierarchy to a second level of the cache memory hierarchy; and transmitting locality information assigned for storage with the cache line as a low locality of reference (LLR) bit in the second level of the cache memory hierarchy, wherein the locality information indicates that the probability that the cache line will be used in a predetermined amount of time in the future is less than that of typical data in a cache line, wherein the second level of the cache memory uses the locality information in replacement and allocation decisions for the second level of the cache memory.

6. A system comprising: a multi-level cache memory; and a processor to evict a cache line from a first level to a second level of the multi-level cache memory and to transmit locality information as a low locality of reference (LLR) bit stored with the cache line in the second level of the cache memory, wherein the locality information indicates that the probability that the cache line will be used in a predetermined amount of time in the future is less than that of typical data in a cache line, wherein the second level of the cache memory uses the locality information in replacement and allocation decisions for the second level of the cache memory.

7. A processor having multi-level cache hierarchy comprising: a first level cache where cache lines have an associated Low Locality of Reference (LLR) bit to indicate a probability that the cache line will be used within a predetermined time period, wherein the LLR bit indicates that the probability that the cache line will be used in a predetermined amount of time in the future is less than that of typical data in a cache line; and an outer level cache to receive a cache line evicted from the first level cache and a decision based on a stored LLR bit transferred with the evicted cache line determines an action to take with the evicted cache line, wherein the outer level of the cache memory uses the LLR bit in replacement and allocation decisions for the outer level of the cache memory.

8. The processor of claim 7 wherein the outer level cache has an LLR line stored in the set that is replaced by the LLR line from the first cache.

9. The processor of claim 7 wherein the outer level cache does not have an LLR line stored in the set and a replacement is not allowed.

10. The processor of claim 7 wherein the cache line retains the LLR bit and may move back and forth within the cache hierarchy until evicted from the outer level of the cache hierarchy.

* * * * *